United States Patent
Sawatari (10) Patent No.: US 7,171,627 B2
(45) Date of Patent: Jan. 30, 2007

(54) DEVICE FOR DISPLAYING LINK INFORMATION AND METHOD FOR DISPLAYING THE SAME

(75) Inventor: Ryusuke Sawatari, Kanagawa (JP)

(73) Assignee: Sony Corporation, Tokyo (JP)

( * ) Notice: Subject to any disclaimer, the term of this patent is extended or adjusted under 35 U.S.C. 154(b) by 345 days.

(21) Appl. No.: 09/897,172

(22) Filed: Jul. 2, 2001

(65) Prior Publication Data

US 2002/0044162 A1   Apr. 18, 2002

(30) Foreign Application Priority Data

Jul. 5, 2000   (JP)   ............................ P2000-203345

(51) Int. Cl.
*G06F 3/048* (2006.01)
*G06G 5/00* (2006.01)

(52) U.S. Cl. ..................... 715/848; 715/760; 345/632

(58) Field of Classification Search ............... 345/738, 345/713, 133, 418–427, 852, 629–641; 709/300, 709/302, 303, 200; 715/848–852, 757, 760
See application file for complete search history.

(56) References Cited

U.S. PATENT DOCUMENTS

| | | | | |
|---|---|---|---|---|
| 5,708,766 A | * | 1/1998 | Goto ........................... 345/133 |
| 5,708,845 A | * | 1/1998 | Wistendahl et al. ...... 715/500.1 |
| 5,748,193 A | * | 5/1998 | Higashi et al. ............. 345/427 |
| 5,793,901 A | * | 8/1998 | Matsutake et al. .......... 382/294 |
| 5,848,373 A | * | 12/1998 | DeLorme et al. ........... 701/200 |
| 5,926,116 A | * | 7/1999 | Kitano et al. ................ 340/988 |
| 6,020,891 A | * | 2/2000 | Rekimoto .................... 345/419 |
| 6,084,589 A | * | 7/2000 | Shima ......................... 345/419 |
| 6,282,362 B1 | * | 8/2001 | Murphy et al. ................ 386/46 |
| 6,414,679 B1 | * | 7/2002 | Miodonski et al. ......... 345/420 |
| 6,512,857 B1 | * | 1/2003 | Hsu et al. .................... 382/294 |
| 6,570,587 B1 | * | 5/2003 | Efrat et al. .................. 715/723 |
| 6,597,377 B1 | * | 7/2003 | MacPhail .................... 345/738 |
| 6,636,249 B1 | * | 10/2003 | Rekimoto .................... 715/849 |
| 6,650,343 B1 | * | 11/2003 | Fujita et al. ................. 715/760 |
| 6,653,990 B1 | * | 11/2003 | Lestruhaut ...................... 345/8 |
| 6,741,790 B1 | * | 5/2004 | Burgess ........................ 386/46 |
| 6,778,171 B1 | * | 8/2004 | Kikinis ........................ 345/419 |
| 2002/0067372 A1 | * | 6/2002 | Friedrich et al. ............ 345/753 |

* cited by examiner

*Primary Examiner*—Ba Huynh
(74) *Attorney, Agent, or Firm*—Sonnenschein Nath & Rosenthal LLP (57) ABSTRACT

There are provided a device for displaying link information and a method for displaying the same which display the image of an actual object superimposed with the label of link information so as to easily obtain information on the actual object and to display a moving link. An image input part obtains the image signal of an actual object. A link information receiving part receives link information transmitted by a transmitter. A link contents detection part detects the link contents. An attribute information detection part detects the attribute. A link position detection part detects the link position. The image signal obtained by a synthesizing part is superimposed with the link contents in the display coordinate of a link label calculated by a coordinate conversion part in accordance with the attribute information. A display part displays the image signal synthesized. The user uses a pointing device to easily obtain the link information on the actual object in accordance with the link label.

11 Claims, 8 Drawing Sheets

SCREEN S

FIG.4B

SCREEN S

FIG.4C

SCREEN S

SCREEN S

FIG.6B

SCREEN S

SCREEN S

FIG.8B

SCREEN S

FIG.8C

SCREEN S

FIG.8D

SCREEN S

DEVICE FOR DISPLAYING LINK INFORMATION AND METHOD FOR DISPLAYING THE SAME

RELATED APPLICATION DATA

The present application claims priority to Japanese Application No. P2000-203345 filed Jul. 5, 2000, which application is incorporated herein by reference to the extent permitted by law.

BACKGROUND OF THE INVENTION

1. Field of the Invention

The present invention relates to a link information display device for obtaining the image signal of an actual object by an imaging device or an image recorder, and receiving link information on the actual object transmitted by a link information transmitter, thereby displaying the link information superimposed on the image signal of the actual object.

2. Description of the Related Art

In recent years, there has been overspread a method in which a technique such as WWW (World Wide Web) for transmitting and receiving information on the Internet, or MPEG4 (Moving Picture Expert Group4) for compressing and reproducing moving pictures is used to embed a hyperlink label into a suitable position of a text, still image or moving image, whereby the user performs a predetermined operation for this hyperlink label, so as to easily obtain hyperlink information associated with the label. The hyperlink label herein is referred to as a character string configuring URL (Uniform Resource Locator) for use in, e.g., HTTP (Hyper text Transfer Protocol). Information associated with the hyperlink label, e.g., information such as the link contents, link attribute, and link position is called hyperlink information. For convenience, the hyperlink label is hereinafter referred to simply as a link label, and information associated with the link label is described as link information.

Definition on format is currently made to embed a link label into an image or a moving picture. How link information associated with a link label to be embedded is generated is being studied and developed.

In the field of Augmented Reality, there have been advanced studies for adding information of a virtual world to the real world.

Among them, a method capable of obtaining information on an actual object has been also proposed. For example, it is possible to provide means for displaying, on an image display device, link information superimposed on the image signal of an actual object filmed by an imaging device and associated with the actual object, whereby the user can easily obtain the information on the actual object.

The foregoing prior art includes any one of the problems as described below. There has not been a method for solving these at the same time yet. Obtainable information is an ID (identification number) of an object. The ID must be separately converted to link information, specifically, URL. For this reason, an information obtaining side must always prepare database indicating association of the ID with the link information.

As for the positional information of an object, for example, only the extent that in which room an object is present can be recognized, and the precise position or direction of the object cannot be recognized.

Further, an ID is recognized by image processing a tag provided in an object. The user must thus be in a position to recognize the tag.

Furthermore, only the information on an object itself provided with a tag into which an ID is written can be obtained. To obtain information on another object, the object must be also provided with a tag. There is also the disadvantage that a link label moving in the space cannot be expressed.

SUMMARY OF THE INVENTION

The present invention has been made in view of such circumstances, and an object of the present invention is to provide a device for displaying link information and a method for displaying the same, which can display the label of link information received by a receiver superimposed on the image of an actual object to easily obtain information on the actual object, and also display a moving link.

To achieve the foregoing object, a link information display device of the present invention for displaying link information transmitted by a link information transmitter, comprises image input means for obtaining an image signal, receiving means for receiving the link information, synthesizing means for superimposing the received link information on the image signal, and display means for displaying the image signal synthesized.

In the present invention, preferably, the image input means comprises an imaging device for imaging the image signal of an actual object, or an image signal reproducing device for reproducing an image signal stored onto an image recording medium.

The present invention preferably comprises attribute information detection means for detecting attribute information from the received link information, and selection means for, when the link information transmitter transmits a plurality of pieces of link information, selecting predetermined link information in accordance with the attribute information detected by the attribute information detection means.

The present invention preferably comprises link position detection means for detecting link position information from the received link information, and coordinate conversion means for determining a display position to display the link on the display means in accordance with the link position information.

In the present invention, preferably, the coordinate conversion means calculates a display position to display the link on the display means in accordance with the link position information and the position of the transmitter.

In the present invention, preferably, the display means lines up and displays these pieces of link information in predetermined positions on the display screen when a plurality of pieces of link information are displayed.

A link information display method of the present invention for displaying link information transmitted by a link information transmitter, comprises the steps of:

obtaining an image signal;
receiving the link information;
superimposing the received link information on the image signal; and
displaying the image signal superimposed with the link information.

The present invention preferably comprises a step of storing the image signal superimposed with the link information.

Thus, there are provided a device for displaying link information and a method for displaying the same according to the present invention, which needs not to have database associated with geographic information, e.g., information such as a map, can supply hyperlink information associated with an actual object in an optional coordinate position in the space to the user by a convenient method, and display hyperlink information on a moving object on, e.g., the screen of the display device in accordance with the movement of the moving object, whereby the user can conveniently obtain information on an object in the real world.

Further, according to the present invention, in place of an object incapable of being provided with a transmitter which physically transmits link information, a transmitter in a position spatially away from the object substitutably transmits hyperlink information on the object, so as to provide link information of the object incapable of being provided with a transmitter.

Furthermore, link information can be selected in accordance with the attribute information of the link information, based on the request of the user, thereby supplying to the user only the link information belonging to a predetermined category.

DETAILED DESCRIPTION OF THE PREFERRED EMBODIMENTS

Figure 1:
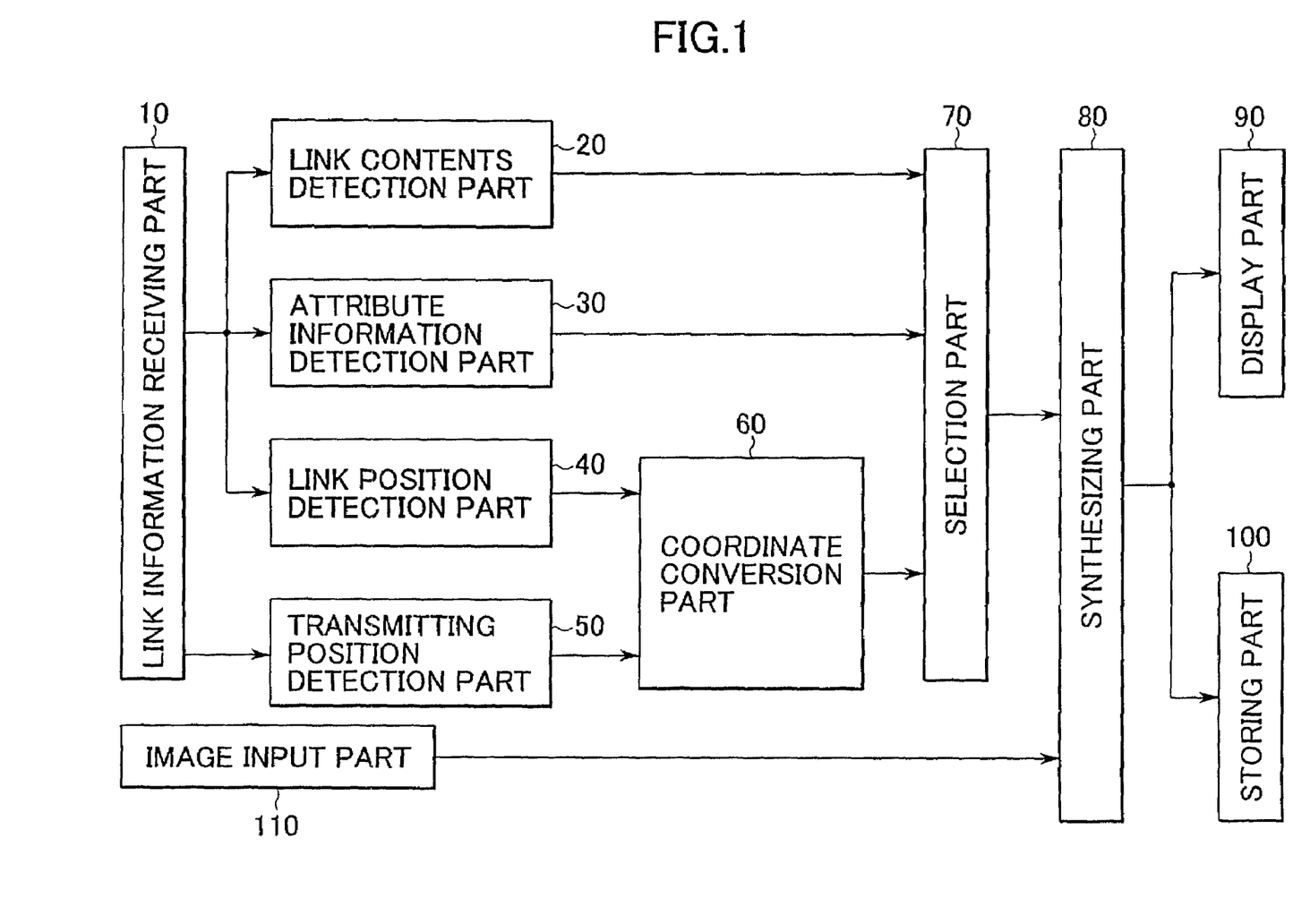
FIG. 1 is a block diagram showing one embodiment of a link information receiver according to the present invention.

FIG. 1 is a block diagram showing one embodiment of a link information display device according to the present invention.

As illustrated, the link information display device of this embodiment has a link information receiving part 10, a link contents detection part 20, an attribute information detection part 30, a link position detection part 40, a transmitting position detection part 50, a coordinate conversion part 60, a selection part 70, a synthesizing part 80, a display part 90, a storing part 100, and an image input part 110.

The parts for constructing the link information display device of this embodiment will be described.

The link information receiving part 10 receives link information transmitted by a link information transmitter, not shown. The link information transmitter transmits to the surroundings link information on one or a plurality of objects through a transmission path such as an electric wave. The link information receiving part 10 receives an electric wave signal transmitted by the link information transmitter, and then, demodulates and decodes the receiving signal in accordance with the coding system and modulation system for use in the link information transmitter, thereby supplying the receiving signal to the link contents detection part 20, the attribute information detection part 30, the link position detection part 40, and the transmitting position detection part 50.

The link information transmitted by the transmitter will be described here. The link information is constructed of information indicating the link contents, attribute information, and link position.

The link contents consist of, e.g., data indicating a link destination, e.g., information such as a character string configuring URL. By way of example, the link contents consist of data information indicating an address on the network of an information providing server holding information on a certain object, e.g., a character string of a web address "http://dreamsite.net.com/".

The attribute information is added to a link. For example, the attribute information adds a name with a character string "dream home page" to the web address "http://dreamsite-.net.com/", and displays the color of a link or the category of link destination information.

The link position is positional information when considering that a link is present virtually in the space. For example, the parallel or rotational movement of a link coordinate system Cl viewed from a coordinate system Ct of the transmitter is expressed by a 4×4 array using a homogenous coordinate system.

The homogeneous coordinate system here is a coordinate display system for expressing, e.g., a point [x, y] in the two-dimensional space as [x, y, 1]. A point [x, y, m] in the homogeneous coordinate system expresses a point [x/m, y/m] in a normal coordinate system. Here, m acts as magnification; m=0 expresses an infinite far point.

In the two-dimensional homogeneous coordinate system, coordinate conversion, e.g., parallel movement and rotation can be expressed in a form of a 3×3 conversion array.

In the homogeneous coordinate system of the three-dimensional space, a point [x, y, z] can be expressed as [x, y, z, 1]. In the three-dimensional homogeneous coordinate system, coordinate conversion such as parallel movement and rotation can be expressed in a form of a 4×4 conversion array.

The link information is constructed of a combination of the elements of the above-mentioned link contents, attribute information, and link position information. Part of these, however, may be omitted. For example, the link information may be constructed of only the link contents or only the attribute information.

The link information transmitter, not shown, has, for example, a link contents generation part for generating the link contents, a link position generation part for generating a link position, an attribute information generation part for generating attribute information, a multiplexing circuit for multiplexing information generated by these, and a transmitting circuit for transmitting the multiplexed information, by means of, e.g., an electric wave. The link position information is positional information when considering that a link is present virtually in the space, as described above. The link position information is, e.g., information indicating the space position of the link coordinate system Cl viewed from the coordinate system Ct of the transmitter, or information indicating the space position of the link coordinate system Cl viewed from a coordinate system Cg of a third object as a reference for determining a position for both transmission and reception.

Transmission of the link information is not limited to use of an electric wave, and may be performed using other transmission methods, e.g., magnetism, an infrared ray or the like. The link information may be transmitted continuously timewise, or may be repeatedly transmitted at fixed intervals.

The link information transmitted by the link information transmitter is received by the link information receiving part 10. The receiving signal is then outputted to the link contents detection part 20, the attribute information detection part 30, the link position detection part 40, and the transmitting position detection part 50.

When transmitting and receiving the link information, there is employed a radio system grasping the positional relation between the transmitter and the receiver, e.g., a system for modulating and demodulating, or a system for coding and decoding a signal determined by a radio protocol for use in the transmitter. In other words, the positional relation between the coordinate system Ct of the transmitter and the coordinate system Cr of the receiver (parallel or rotational movement) is determined by the signal received by the link information receiving part 10. For example, there are considered GPS (Global Positioning System), a method for measuring distances or directions for use in radio navigation, and application of a detection technique using magnetism as well as an electric wave.

The link contents detection part 20 detects the link contents from the receiving signal to output the link contents to the selection part 70.

The attribute information detection part 30 detects the attribute information from the receiving signal to output the attribute information to the selection part 70.

The link position detection part 40 detects the link position information from the receiving signal to output the link position information to the coordinate conversion part 60.

The transmitting position detection part 50 obtains from the receiving signal the positional relation between the coordinate system Ct of the link information transmitter and the link information receiver to output the positional relation to the coordinate conversion part 60.

The coordinate conversion part 60 combines the link position information from the link position detection part 40 with the positional relation information from the transmitting position detection part 50 so as to convert the link position information to the coordinate system Cr, thereby converting the link position information to a coordinate system Cs when the link information is finally displayed on the display part 90.

At this time, when only the presence or absence of the link is important and the precise position is not required, the link information may be converted to a convenient position to display it on the display part 90. For example, when the link information is displayed on the screen of the display part 90, and it is desired to indicate only that the link is present in a range displayed on the screen, the link information may be lined up at the right end or the left end on the screen. Further, considering the rotational movement of the link, the link information is positioned in the hard-to-read direction, the link information may be viewed horizontally on the screen.

The selection part 70 selects the inputted link information to be passed to the synthesizing part 80, based on the link attribute information from the attribute information detection part 30. It is possible to categorize the links based on the attribute information and to display only the link in the necessary category.

The image input part 110 inputs the image signal of an object. For example, the image input part 110 supplies an image signal filming an actual object by a video camera to the synthesizing part 80. In addition, the image input part 110 can obtain an image signal read from an image recording medium such as a magnetic tape or optical disc by an image signal recorder, not shown, so as to supply the image signal to the synthesizing part 80.

The synthesizing part 80 superimposes, on the image signal supplied from the image input part 110, the link information inputted from the selection part 70, e.g., the link contents in the display position of the link label expressed by the coordinate system Cs in accordance with the attribute information. For instance, when the attribute information includes a color of the link, the link label is drawn in a suitable color to be super imposed on the image signal.

The display part 90 is, e.g., a display device having a screen for displaying an image, and displays the image signal from the synthesizing part. The inherent coordinate system Cs on the screen of the display part 90 is determined previously. The coordinate conversion part 60 calculates a coordinate value in the screen coordinate system Cs of the link coordinate, in accordance with the link position obtained from the link position detection part 40 and the positional relation between the transmitter and the receiver obtained from the transmitting position detection part 50. The synthesizing part 80 generates a synthesizing image signal for displaying the link contents superimposed on the image signal in accordance with the coordinate value calculated.

The storing part 100 stores the image signal generated by the synthesizing part 80 onto a predetermined recording medium.

Figure 2:
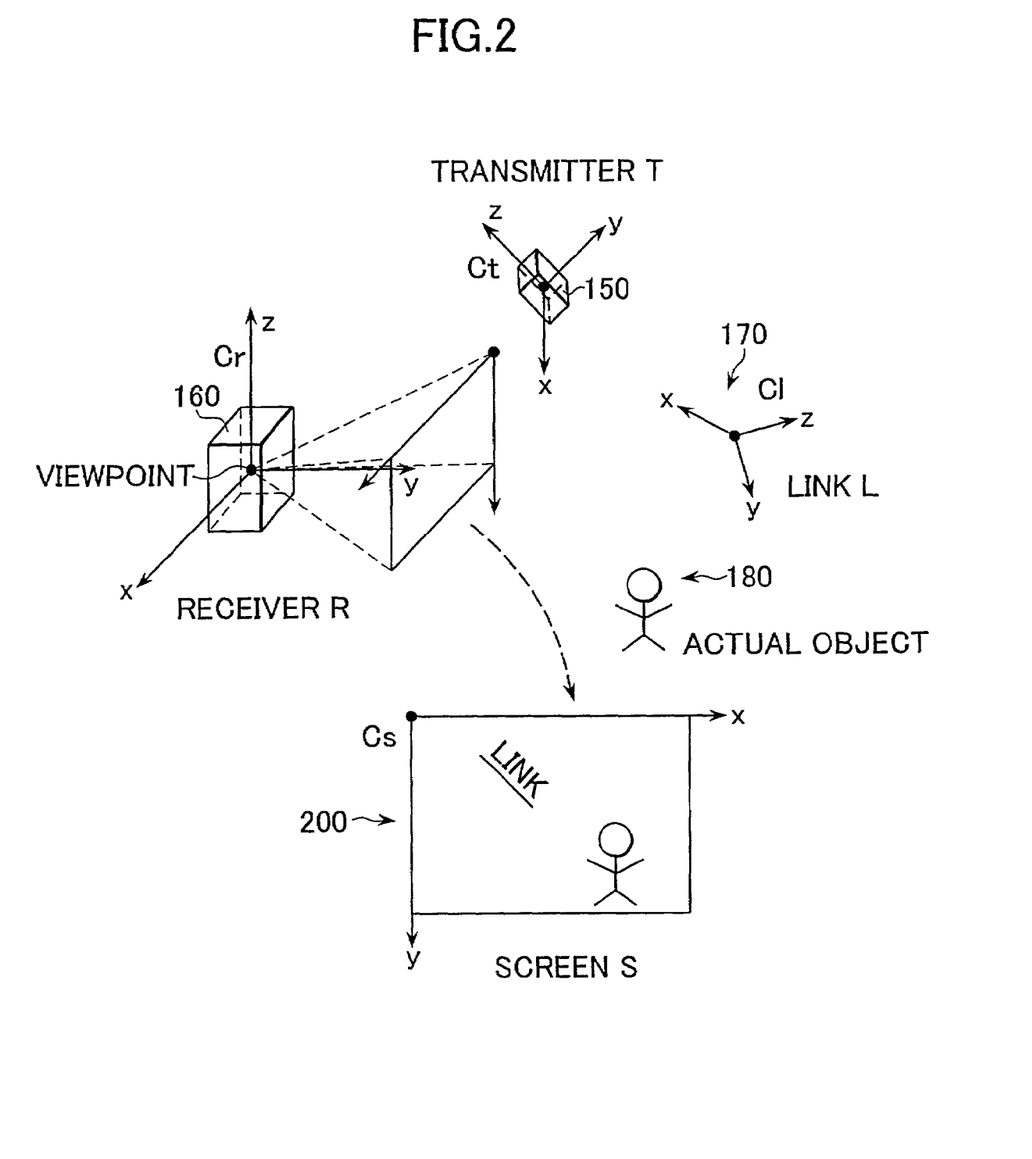
FIG. 2 is a diagram showing one construction example of a system including the link information receiver of the present invention.

FIG. 2 is a diagram showing one construction example of a system using the receiver shown in FIG. 1

As illustrated, the system has a transmitter 150, a receiver 160, and an actual object 180. A link 170 is hyperlink information associated with one point in the space. A screen 200 shows, e.g., a display screen for displaying the image signal in the receiver 160.

The transmitter 150, the receiver 160, and the link 170 have respectively inherent coordinate systems Ct, Cr and Cl. The coordinate systems can form an optional positional relation each other in the space. The coordinate system Cs of the screen 200 bears a fixed relation to the coordinate system Cr of the receiver 160. The set of the receiver 160 and the screen 200 envisages that a video camera is incorporated into the receiver. In this case, the image displayed on the screen 200 viewed from the viewpoint of the receiver 160 shown in FIG. 2 can be regarded as the image imaged by the video camera.

In FIG. 2, to prevent troublesomeness, the system is simplified as follows. A typical system has a plurality of transmitters, receivers, and links. FIG. 2 shows only one transmitter, one receiver, and one link. Further, in the drawing, the coordinate system Cs of the screen 200 sets the origin at the upper-left side, but may set the origin in the center of the screen, or may set the origin so that the X axis and the Y axis are in different directions.

The position of the viewpoint of viewing the screen 200 coincides with the origin of the coordinate system Cr of the receiver, but may be in another position. Important is that the positions of the coordinate system Cr of the receiver and the coordinate system Cs of the screen bear a certain fixed relation.

In the system shown in FIG. 2, the transmitter 150 transmits link information associated with one point in the space, by, e.g., an electric wave. The receiver 160 receives the link information. The image input part inputs, e.g., an image signal of the actual object 180 by a video camera. When the video camera is directed to the actual object 180, the image of the actual object 180 is displayed on the display screen of the display part provided in the receiver, that is, on the screen 200 shown in FIG. 2.

Based on the link information received by the receiver 160, a link label having a predetermined attribute and direction is displayed in a predetermined position on the screen 200. When the user specifies the link label on the display screen using a pointing device, e.g., a mouse or light-pen, information associated with the link label is displayed. For example, when a point as a noted place is associated with the link 170 and the actual object 180 is a person, the image of the person and the link label of the link information associated with the noted place transmitted by the transmitter 150 are displayed on the screen. For this reason, the user specifies the link label so as to access the link information on the noted place, e.g., a home page describing the noted place in detail.

For example, when a person provided with the transmitter 150 is filmed, link information on the person superimposed on the image signal can be also displayed on the screen 200. In this case, the link coordinate system Cl can be set to coincide with the coordinate system Ct of the transmitter 150 (that is, Ct=Cl). In addition, generally, the link coordinate Cl can be set in a position away from the transmitter 150 (that is, Ct≠Cl), as shown in FIG. 2.

The operational example of this embodiment will be hereinafter described with reference to the drawings.

First Operational Example

First, a first operational example will be described with reference to FIG. 3.

Figure 3:
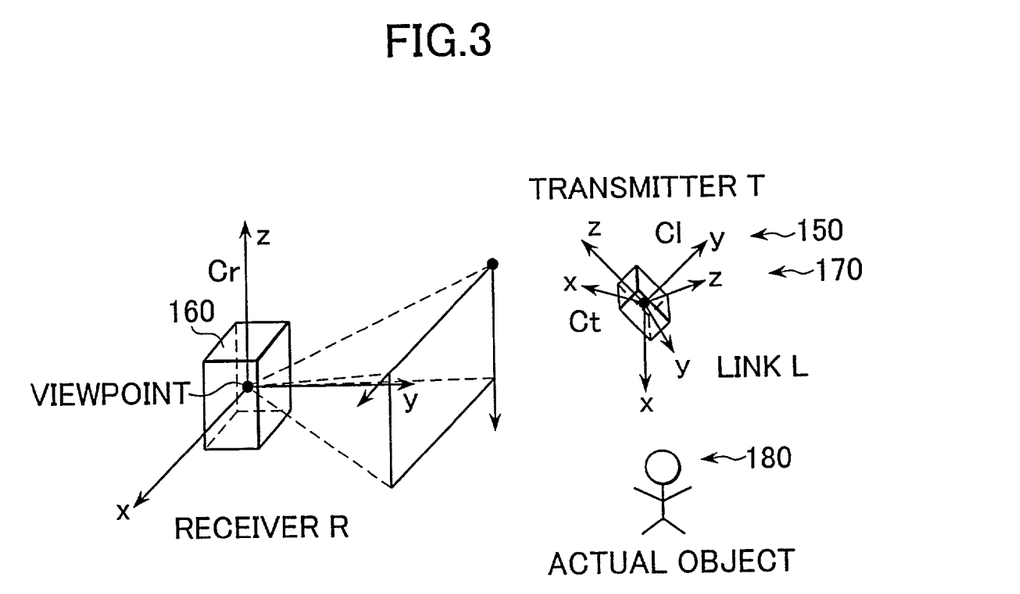
FIG. 3 is a diagram showing the construction of a system when a transmitter transmits link information provided with the transmitter.

FIG. 3 shows an example in which the transmitter 150 itself is provided with the link 170 and transmits link information. In other words, as shown in FIG. 3, the origin of the coordinate system Ct of the transmitter 150 coincides with the origin of the link coordinate system Cl. At this time, the position of the link coordinate system Cl viewed from the coordinate system Ct of the transmitter 150 includes only the component of the rotational movement, but not the component of the parallel movement.

Figure 4A:
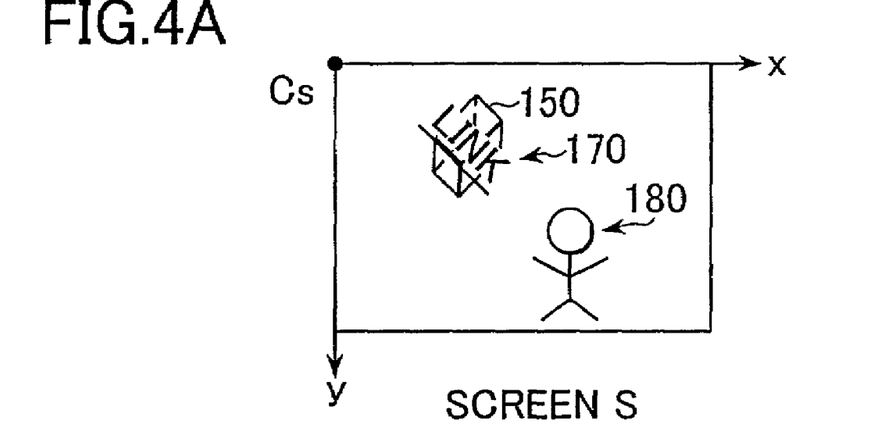
FIGS. 4A to 4C show a screen of the display part of the receiver of the system shown in FIG. 3.

When the link information is filmed by the receiver, the image of the actual object 180, the physical image of the transmitter 150, and a link label provided in the transmitter 150 are displayed on the screen, as shown in FIG. 4A.

Figure 4B:
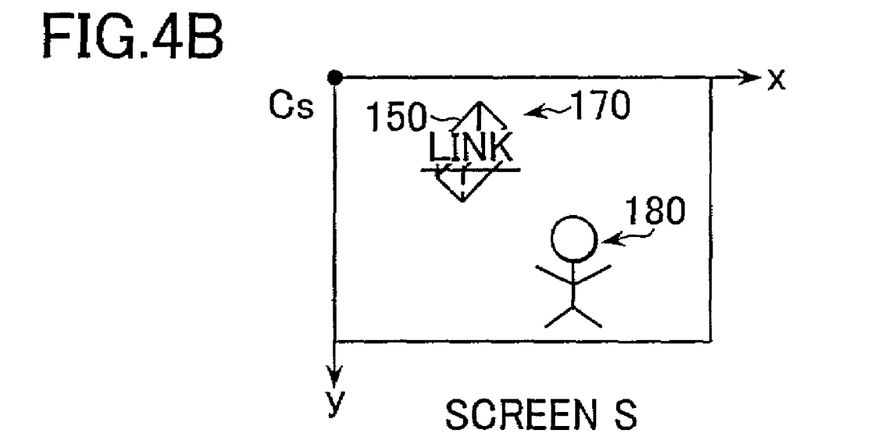

In this case, in the event that the component of the rotational movement allows the characters of the link label displayed on the screen to be hard to read, the coordinate conversion may be adjusted in the coordinate conversion part 60 in the receiver 160 so that the link label is horizontal on the screen, as shown in FIG. 4B.

Figure 4C:
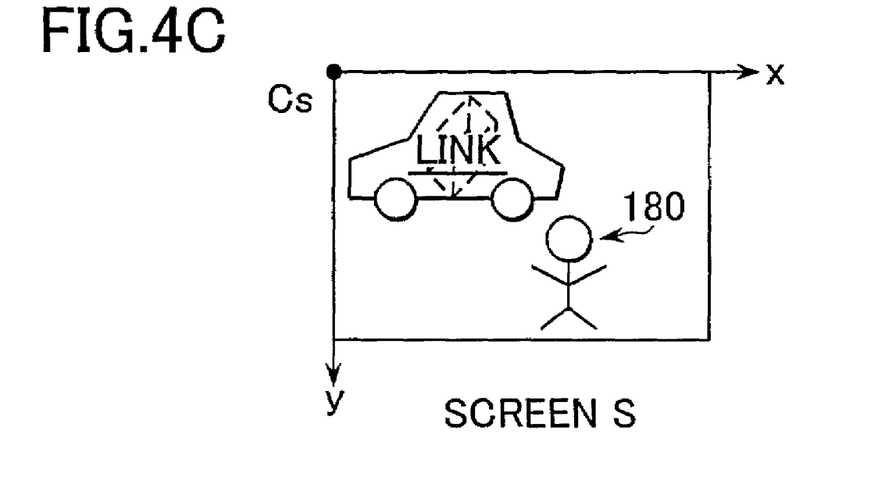

As shown in FIG. 4C, when the transmitter 150 is mounted on a moving object, e.g., an automobile, the link label can be displayed on the screen in accordance with the moving automobile. In other words, in accordance with the change of the position of the moving object, e.g., the automobile, the transmitted link position information is also changed accordingly. The link position information changed is converted to the coordinate system Cs of the screen by the coordinate conversion part 60 of the receiver 160. The link label displayed on the screen is changed in accordance with the physical image of the transmitter 150.

Second Operational Example

Figure 5:
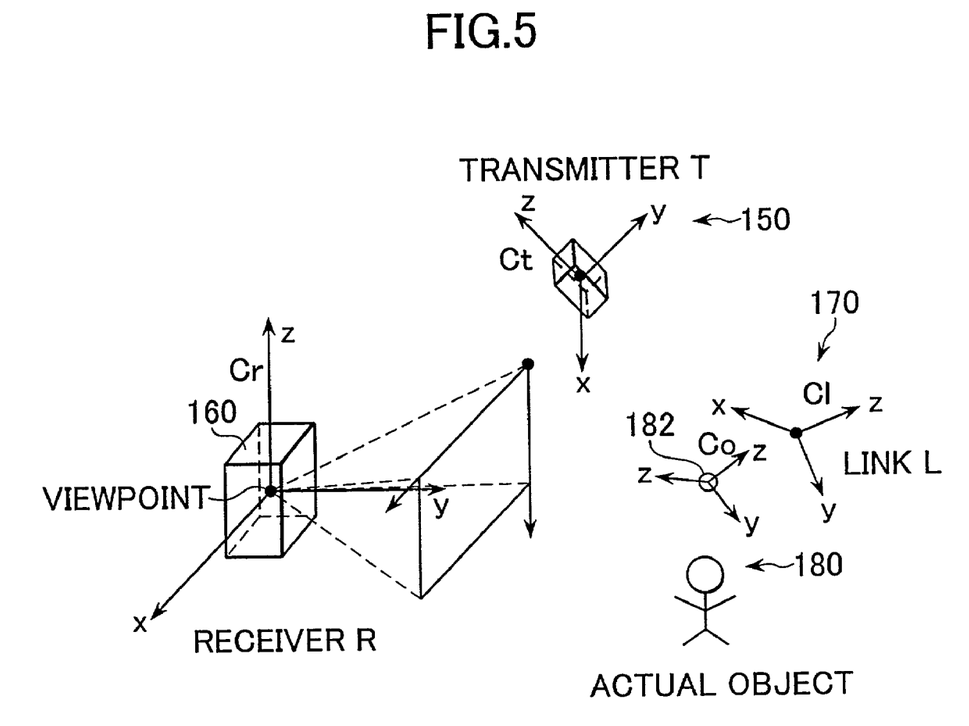
FIG. 5 is a diagram showing the construction example of a system when the transmitter transmits link information in a position away from the transmitter.

FIG. 5 shows an example in which the transmitter 150 transmits link information in a position away from the transmitter 150. In this case, the positional information of the link 170 is generated and transmitted by the transmitter 150 so that the link 170 is in a certain virtual position in the space. For example, as shown in FIG. 5, the link 170 is generated and transmitted by the link position information transmitter 150 so as to be virtually in the position different from that of the transmitter 150.

Figure 6A:
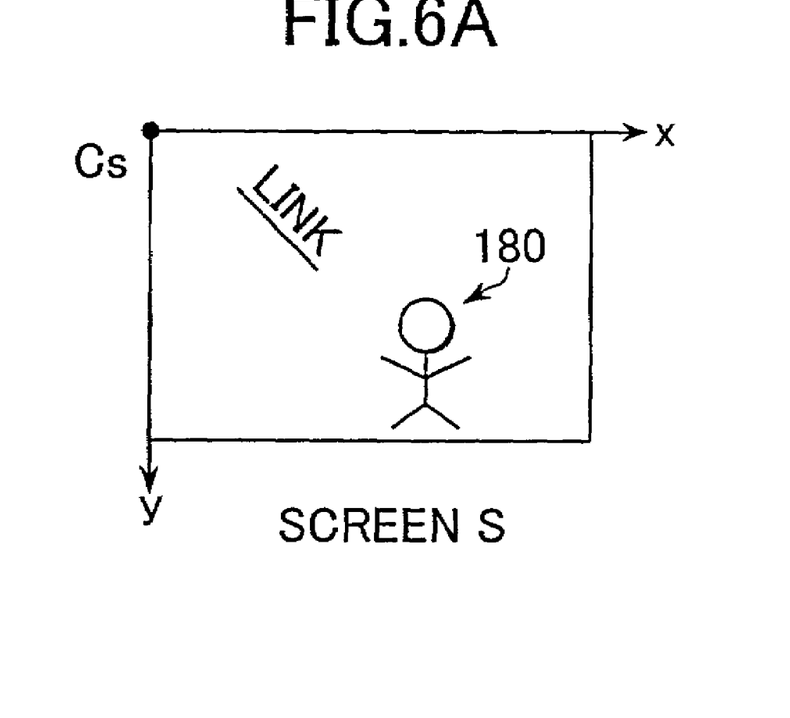
FIGS. 6A and 6B show the screen of the display part of the receiver of the system shown in FIG. 5.

Suppose that the receiver 160 displays the actual object 180 as the image signal obtained from the image input part, e.g., the image signal imaged by the video camera. In this case, a link label corresponding to the link 170 is displayed on the screen. At this time, the transmitter 150 is in a position different from the link position. The physical image of the transmitter 150 is not displayed on the display screen. In other words, as shown in FIG. 6A, on the screen, in addition to the image of the actual object 180, the link label appears to be floated in the space.

Figure 6B:
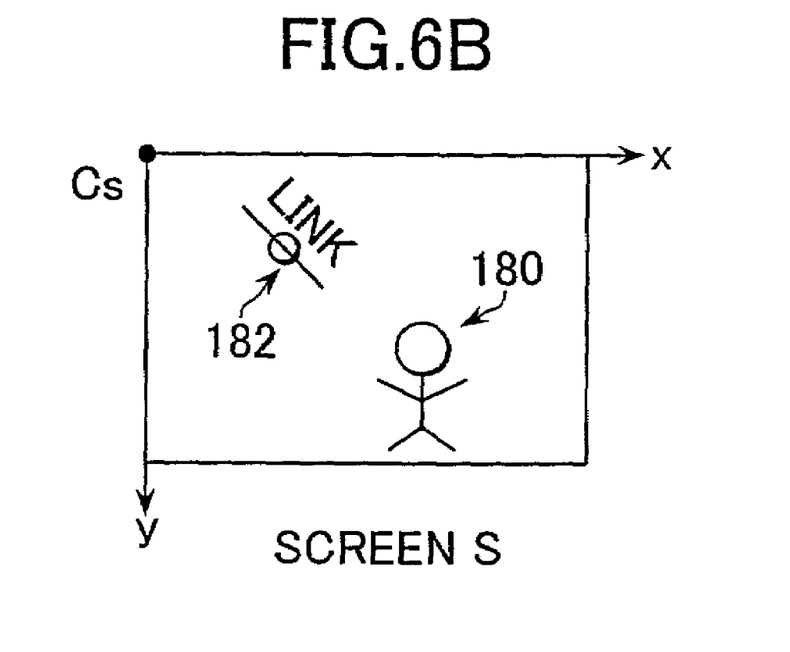

In addition to the image of the actual object 180, for example, as shown in FIG. 5, when a new object 182 is present, a coordinate system fixed to the object is Co. With respect to the object 182, the link position information transmitted by the transmitter 150 is based on the link coordinate system Cl, which coincides with the coordinate system of the object 182 (i.e., Cl=Co). The display part of the receiver 160 displays a link label provided with the image of the object 182, as shown in FIG. 6B.

This method is used when the object 182 cannot be provided with the transmitter due to its small size. The link information of the object 182 is transmitted by the transmitter 150 spatially away from the object 182; it can be regarded that in place of the object disposed in a position away from the transmitter 150, the transmitter 150 substitutably transmits the link information thereof.

When the positional information transmitted by the transmitter 150 is changed with time, a moving link label is displayed on the screen of the display device of the receiver 160. For example, in FIG. 6A, the positional information of the link coordinate system Cl is changed with time so as to provide a visual effect so that the link label floated in the space appears to have a circular movement. Further, as shown in FIG. 6B, when the position of the object 182 is changed, the positional information transmitted by the transmitter 150 is changed in accordance with the change of the position of the object 182. Thus, the screen of the display part of the receiver 160 can obtain a visual effect of changing the display position of the link label in accordance with the object 182.

Third Operational Example

Figure 7:
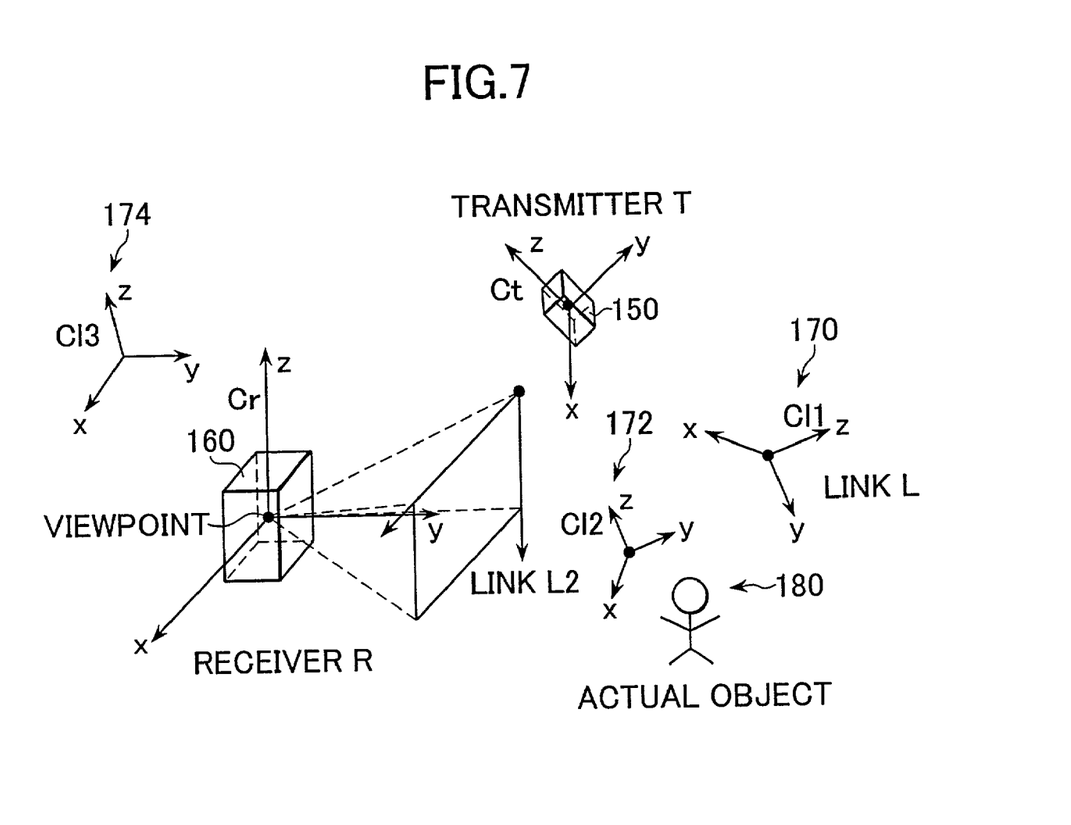
FIG. 7 is a diagram showing the construction example of a system when the transmitter transmits a plurality of pieces of information.

FIG. 7 shows an operational example when a plurality of pieces of link information are transmitted by the transmitter 150. These pieces of link information are associated with the points in the respective spaces. As illustrated, the transmitter 150 transmits, e.g., three pieces of link information of links 170, 172 and 174. The receiver 160 receives the information of the transmitted links 170, 172 and 174. The screen of the display part displays link labels associated with the received link information, together with the image of the actual object 180.

Figure 8A:
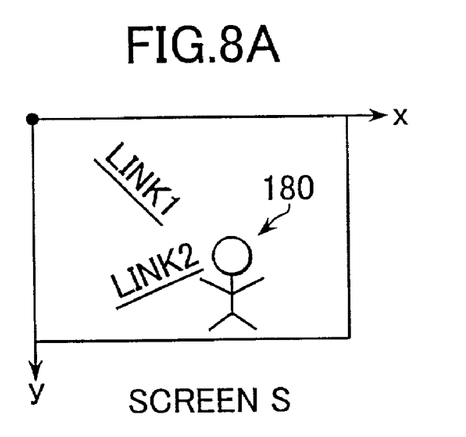
FIGS. 8A to 8D show the screen of the display part of the receiver of the system shown in FIG. 7.

In this case, the display coordinate of the link label on the screen can be calculated precisely in accordance with each piece of the received link position information. The link labels associated with the links 170 and 172 can be displayed on the screen in accordance with the calculated results. On the other hand, the link label associated with the link 174 is not displayed because it is not in the display range of the screen. As a result, for example, as shown in FIG. 8A, in addition to the image of the actual object 180, two link labels are displayed.

Figure 8B:
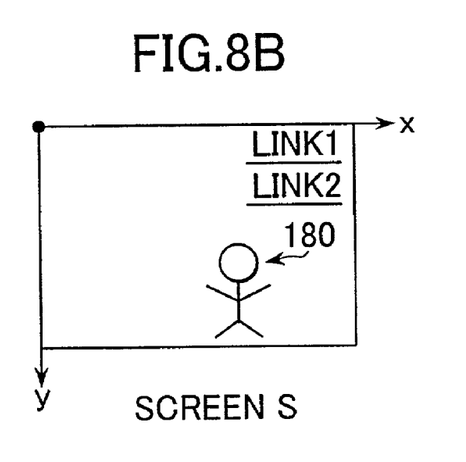

When a plurality of link labels are displayed on the screen in accordance with a plurality of pieces of link information and the link label is displayed in the coordinate position of each of the link labels calculated in accordance with each piece of the link position information, the screen may be hard to see in some cases. In this case, as shown in FIG. 8B, a plurality of link labels can be lined up and displayed at the right end or an easy-to-see suitable position on the screen. Thus, the link labels on the screen can be displayed understandably, and more pieces of link information can be provided without giving a discomfortable feeling to the user.

Figure 8C:
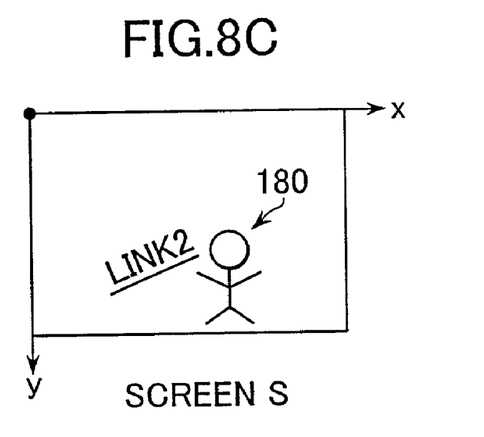
Figure 8D:
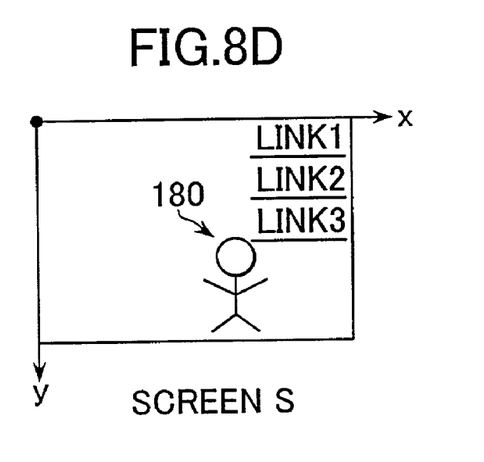

The link positioned outside the display range on the screen may be also displayed in a predetermined position on the screen. When the actual object is not displayed on the screen, the user can obtain link information on the object. For example, the link 174 is positioned outside the display range on the screen, but, as shown in FIG. 8D, the link label (a link 3) of the link 174 may be included to be lined up and displayed at the right end.

When the transmitter 150 transmits a plurality of pieces of link information, the receiver 160 can categorize a plurality of pieces of the link information in accordance with the attribute information of the received link information. Then, only the link information belonging to a desired category can be displayed on the screen of the display part. In other words, when the category as attribute information is described in a plurality of pieces of the link information transmitted by the transmitter 150, the link information can be categorized in accordance with the category of the attribute information, thereby displaying only the link information belonging to the category specified by the user.

For example, in FIG. 7, suppose that the attribute information of the link 170 is provided with category="personal information", and the attribute information of the link 172 is provided with category="store information". In selection and specification by the user, for example, store information is selected. The selection part 70 of the receiver 160 selects only the link information provided in the attribute information with category="store information" to be outputted to the synthesizing part 80. For this reason, as shown in FIG. 8C, the display part 90 displays only the link label associated with the link information provided with the category of "store information". The user can draw out desired information in accordance with the link label displayed.

As described above, according to this embodiment, the receiver which receives link information transmitted by the transmitter displays on the display device the image signal of an actual object obtained by the image input part and a link label associated with the received link information, and supplies to the user the image signal of the actual object and the link information on the actual object, thereby providing the user with necessary information by a more convenient method.

What is claimed is:

1. A link information display device for displaying link information transmitted by a link information transmitter, comprising:

video input means for obtaining a video signal of real space;

receiving means for receiving said link information comprising link content information, attribute information and link position information, wherein said link position information comprises virtual space position information in a three-dimensional coordinate system;

transmitting position detection means for detecting the position of said transmitter in the three-dimensional coordinate system in accordance with said received link information;

coordinate transformation means for transforming the three-dimensional coordinate system of said link position information and the position of said transmitter into a display position three-dimensional coordinate system;

display position determining means for determining a display position of said link content information on the basis of said display position three-dimensional coordinate system and said attribute information;

superimposing means for superimposing said link content information onto said video signal in accordance with said display position determined by said display position determining means; and display means for displaying said superimposed video signal.

2. The link information display device according to claim 1, wherein said video input means comprises a video camera for inputting the video signal of an actual object.

3. The link information display device according to claim 1, wherein said video input means comprises a video signal reproducing device for reproducing the video signal stored onto a video recording medium.

4. The link information display device according to claim 1, further comprising storing means for storing said superimposed video signal.

5. The link information display device according to claim 1, comprising selection means for, when said link information transmitter transmits a plurality of pieces of link information, selecting predetermined link information in accordance with said attribute information.

6. The link information display device according to claim 1, wherein said coordinate transformation means calculates a display position to display a link on said display means in accordance with said link position information and the position of said transmitter so that said link content information is viewed horizontally on said display screen.

7. The link information display device according to claim 1, wherein when a plurality of pieces of link information are received by said receiving means and said display position determining means determines the precise positions are not required on the basis of said attribute information, said display position determining means determines to line up and display these pieces of link information at predetermined positions on the display screen.

8. A link information display method for displaying link information transmitted by a link information transmitter, comprising the steps of:

obtaining a video signal of real space;

receiving said link information, said link information comprising link content information, attribute information and link position information, wherein said link position information comprises virtual space position information in a three-dimensional coordinate system;

detecting the position of said transmitter in the three-dimensional coordinate system in accordance with said received link information;

transforming the three-dimensional coordinate system of said link position information and the position of said transmitter into a display position three-dimensional coordinate system;

determining a display position of said link content information on the basis of said display position three-dimensional coordinate system and said attribute information;

superimposing said received link content information on said video signal in accordance with said display position determined by said display position determining means; and displaying the video signal superimposed with said link information.

9. The link information display method according to claim 8, comprising a step of, when said link information transmitter transmits a plurality of pieces of link information, selecting predetermined link information in accordance with said attribute information.

10. The link information display method according to claim 8, comprising a step of, when a plurality of pieces of link information are transmitted and it is determined that the precise positions are not required on the basis of said attribute information, lining up and displaying a plurality of pieces of the received link information in predetermined positions on the screen to display said image signal.

11. The link information display method according to claim 8, comprising a step of storing the video signal superimposed with said link information.

* * * * *